United States Patent [19]

Behrmann et al.

[11] Patent Number: 4,479,926
[45] Date of Patent: Oct. 30, 1984

[54] TREATMENT OF RESIDUAL BOTTOMS FROM FLUOROSULFURIC ACID REGENERATION

[75] Inventors: William C. Behrmann; Thomas G. Jones, both of Baton Rouge, La.

[73] Assignee: Exxon Research & Engineering Company, Florham Park, N.J.

[21] Appl. No.: 563,076

[22] Filed: Dec. 19, 1983

[51] Int. Cl.³ .................. C01B 17/46; C01B 7/19; C01B 17/50; C01B 17/04
[52] U.S. Cl. .................. 423/467; 423/483; 423/484; 423/540; 423/574 R
[58] Field of Search .......... 423/483, 484, 467, 468, 423/540, 574 R

[56] References Cited

U.S. PATENT DOCUMENTS

| | | | |
|---|---|---|---|
| 2,313,103 | 3/1943 | Thomas | 196/10 |
| 2,344,469 | 3/1944 | McAllister | 260/683.4 |
| 3,925,318 | 12/1975 | Parker et al. | 260/683.58 |
| 3,976,759 | 8/1976 | Bennett et al. | 423/484 |
| 4,033,899 | 7/1977 | Bennett et al. | 252/420 |
| 4,041,100 | 8/1977 | Behrmann | 260/683.47 |
| 4,065,516 | 12/1977 | Moser, Jr. et al. | 260/683.47 |
| 4,071,576 | 1/1978 | Behrmann et al. | 260/683.47 |
| 4,073,821 | 2/1978 | Siskin | 260/683.47 |
| 4,096,197 | 6/1978 | Mayer | 260/683.47 |
| 4,096,198 | 6/1978 | Mariconda et al. | 260/683.47 |
| 4,096,199 | 6/1978 | Green et al. | 260/683.47 |

FOREIGN PATENT DOCUMENTS 537589  6/1941  United Kingdom ........... 260/683.47

OTHER PUBLICATIONS

"Rapid Method For the Determination of Fluoride in Liquids", S. Bartkiewicz & J. Robinson, Anal. Chim. Acta, 22(1960) pp. 427-431.
"Gas Purification" Third Edition, Gulf Publishing Co., Houston, Texas (1979) pp. 410-421.
"The Analytical Chemistry of Sulfur and Its Compounds Part I", Wiley Interscience (1970) pp. 219-232.

Primary Examiner—G. L. Kaplan
Attorney, Agent, or Firm—Edward H. Mazer

[57] ABSTRACT

A method for treating a waste stream from an alkylation process is disclosed, where the waste stream comprises a fluoride, sulfuric acid, and an acid soluble oil. The method comprises combusting the waste stream, scrubbing the combustion products to remove, fluorine, and recovering sulfur from the combustion products.

22 Claims, 1 Drawing Figure

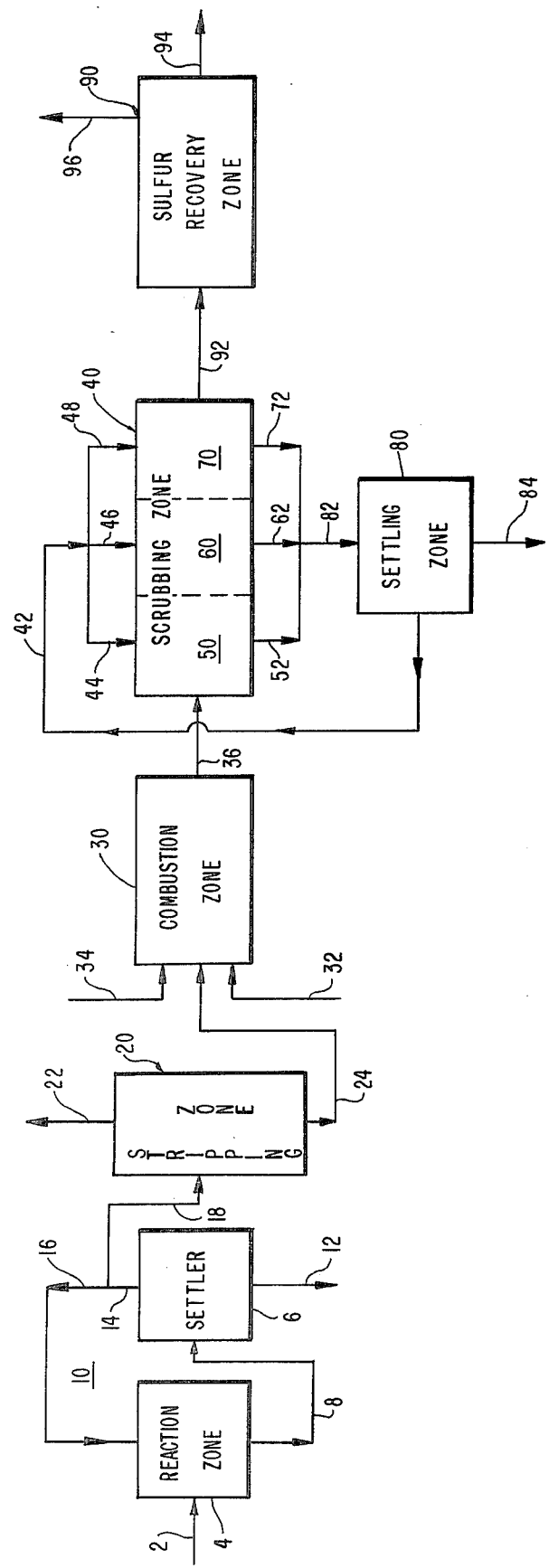

TREATMENT OF RESIDUAL BOTTOMS FROM FLUOROSULFURIC ACID REGENERATION

BACKGROUND OF THE INVENTION

This invention is directed at an improved fluorosulfuric acid alkylation process. More specifically, the present process is directed at a method for reclaiming products present in a residual bottoms stream from a spent fluorosulfuric acid alkylation regeneration process.

As the use of unleaded gasoline has increased and the quality of crude hydrocarbon feedstocks has declined, it has become increasingly important to utilize processes which improve the octane rating of motor fuels. Alkylation processes, directed at the acid catalyzed reaction of an olefin and a paraffin, are widely used to improve the octane rating of motor fuels. Frequently, sulfuric acid and hydrofluoric acid have been used as the acid catalysts.

Fluorosulfuric acid catalysts have been found to produce alkylates having about 2–4 higher octane numbers than sulfuric or hydrofluoric acid catalysts. U.S. Pat. Nos. 2,313,103; 2,344,469; 4,041,100; and 4,065,516 and U.K. Pat. No. 537,589, the disclosures of which are incorporated herein by reference, describe alkylation processes utilizing fluorosulfuric acid catalysts.

Accordingly, it may be desirable to convert sulfuric or hydrofluoric acid alkylation facilities to the use of fluorosulfuric acid. The major equipment for the fluorosulfuric acid alkylation process comprises a reactor-settler combination, similar to that used for the other two acid catalysts. A two-phase mixture of acid catalyst and hydrocarbons is circulated from the reactor to the settler, where the two phases are separated. The hydrocarbon phase is removed from the settler for distillation, while the acid phase from the settler is divided into two streams, the larger of which is returned to the reactor for further catalysis and the smaller of which is sent for regeneration. The need for regeneration of alkylation catalysts is caused by the accumulation of polymeric hydrocarbons and water in the acid until concentrations are reached which are detrimental to alkylate octane.

In the regeneration of fluorosulfuric acid alkylation catalyst, the major portion of the fluorides can be recovered by stripping the spent fluid. However, one of the major problems associated with the use of fluorosulfuric acid catalyst is the disposal of the residual bottoms which remain after the major portion of the fluorides present in the spent acid have been recovered in the stripping step. The residuum cannot be reprocessed or reclaimed in conventional sulfuric acid recovery facilities because of the corrosion and catalyst poisoning atttributable to the presence of small amounts of residual fluorides.

U.S. Pat. No. 4,033,899 discloses a method for the recovery of a fluorosulfonic acid-sulfonic acid catalyst. In this process the spent liquid catalyst is contacted with a bed of silica alumina catalyst at an elevated temperature for an extended period of time, typically 2–6 hours, to remove fluoride compounds. The effluent having a significantly reduced fluoride content is combusted to convert the sulfuric acid to sulfur dioxide. The sulfur dioxide may be passed over an oxidation catalyst such as vanadium pentoxide in the presence of air to convert the sulfur dioxide to sulfur trioxide which may be absorbed in fresh sulfuric acid solution for reuse. In this process, fluorine may react with the silica to form silicon tetrafluoride, which may be hydrolyzed into hydrogen fluoride in the atmosphere.

U.S. Pat. No. 3,976,759 discloses a process for recovering an alkylation catalyst comprising a major amount of sulfuric acid and a minor amount of fluorosulfonic acid. The catalyst is hydrolyzed and distilled to remove most of the fluorides. The hydrogen fluoride in the distillate is converted to fluorosulfonic acid for reuse. The bottoms comprising substantially all the sulfuric acid and less than 10 ppm of hydrofluoric acid is combusted to $SO_2$. The $SO_2$ subsequently is oxidized to $SO_3$ and absorbed in fresh sulfuric acid for reuse. However, the presence of even about 10 ppm of hydrofluoric acid in the bottoms stream may cause corrosion of the $SO_2$ handling facilities and may poison the catalyst utilized to oxidize $SO_2$ to $SO_3$.

Bartkiewicz and Robinson, in "Rapid Method for the Determination of Fluorine in Liquids" *Anal. Chem. Acta*, 22, (1960) pp 427–431 disclose that fluoride containing gases can be recovered in an aqueous scrubbing solution.

Kohl and Riesenfeld report in *Gas Purification*, Third Edition, Gulf Publishing Co., Houston, Tex. (1979) several methods for removing sulfur oxides from gas streams. At pages 410–421 and 679–686, methods for the recovery of sulfur oxides from gas streams utilizing the Claus process alone or in combination with other processes is reported.

U.S. Pat. Nos. 3,295,318; 4,071,576; 4,073,821; 4,096,197; 4,096,198; and 4,096,199 disclose methods for recovery and/or regenerating fluorosulfuric acid alkylation catalysts.

Karchmer, J. H. (ed), in "The Analytical Chemistry of Sulfur and Its Compounds Part I", Wiley Interscience (1970) discusses the chemistry of aqueous solutions of sulfur oxides.

Accordingly, it is desirable to provide a process in which the residual bottoms from a fluorosulfuric acid catalyzed alkylation process are reprocessed.

It is also desirable to provide a process in which the treatment of the residual bottoms is incorporated into a conventional sulfuric acid alkylation facility without the addition of an excessive amount of equipment.

It also is desirable to provide a process in which the sulfur present in the bottoms stream is recovered.

It is further desirable to provide a process in which the fluorides ultimately discharged are rendered relatively inert.

It also is desirable to provide a process in which corrosion resulting from bottoms processing is minimized.

It also is desirable to provide a process in which fluoride discharge to the atmosphere is minimized.

The present invention is directed at a method for treating residual regenerator bottoms comprising acid-soluble oil and a minor amount of fluorosulfuric acid. The method is directed at sequentially combusting the residual bottoms, scrubbing the resulting combustion products to remove fluorides, and treating the sulfur oxides. In a preferred embodiment the sulfur oxides are passed to a conventional sulfur treating facility, such as a Claus plant. The scrubbing solution used to absorb the fluorides preferably is contacted with lime to precipitate the fluorides present.

SUMMARY OF THE INVENTION

In a process for recovering fluorosulfuric acid from a solution comprising fluorosulfuric acid and acid soluble oils wherein the solution is passed to a recovery zone and separated therein into a fluorine rich fraction and into a residuum comprising acid soluble oils, sulfuric acid and a minor amount of fluorine-containing compounds, the improvement comprising:

A. passing residuum into a combustion zone wherein the residuum is combusted to form combustion products;

B. passing combustion products from the combustion zone through a scrubbing zone adapted to remove fluorine from the combustion products; and, C. passing combustion products through a sulfur recovery zone adapted to remove sulfur from the combustion products.

In a preferred embodiment the scrubbing solution utilized in the scrubbing zone comprises an aqueous solution which countercurrently contacts the combustion products. The aqueous solution preferably comprises a precipitating agent adapted to precipitate fluorine absorbed by the scrubbing solution. The precipitating agent preferably comprises calcium or a calcium containing compound. A preferred scrubbing solution comprises a calcium salt and a basic calcium compound, such as calcium oxide or calcium hydroxide and is maintained within a pH range of about 4.4 to about 7.5. The sulfur recovery zone preferably comprises a Claus sulfur conversion facility adapted to convert the sulfur oxides present in the combustion products to elemental sulfur.

BRIEF DESCRIPTION OF THE DRAWING

The FIGURE is a simplified flow drawing of one method for practicing the subject invention.

DETAILED DESCRIPTION OF THE INVENTION

Referring to the FIGURE, a simplified schematic flow diagram is shown of one method for practicing the subject invention. In the FIGURE, all equipment, valves, instrumentation, etc. not necessary for an understanding of the invention have been eliminated.

Alkylation zone 10, of conventional design, comprises a reaction zone 4 and a settler 6. Hydrocarbon feed enters reaction zone 4 through line 2 where the hydrocarbon feed and acid are intimately mixed to form a two phase "emulsion" and to assure the desired product selectivity. This two-phase "emulsion" then passes from reaction zone 4 to settler 6 through line 8 where the two phases settle and are withdrawn as separate streams, a hydrocarbon stream 12 which is further processed (not shown), and an acid stream 14. A major portion of acid stream 14 is recycled through line 16 to reaction zone 4 for further catalysis, while a minor portion is removed for regeneration through line 18 for regeneration as described more fully below. Typically about 99.5 to about 99.9 weight percent of acid stream 14 is recycled to reaction zone 4 while the remainder passes through line 18 for regeneration. Acid stream 14 may comprise acid soluble oils, alkyl fluorides, hydrofluoric acid, fluorosulfuric acid and/or sulfuric acid. Typically this stream will comprise from about 4 to about 20 weight % acid soluble oils and alkyl fluorides, from about 3 to about 15 weight % sulfuric acid, with substantially all the remainder being fluorosulfuric acid. Stream 18 is passed to stripping zone 20 where the more volatile components, such as fluorosulfuric acid and hydrofluoric acid, are removed through line 22 for recovery and reuse. The non-volatilized fraction, typically comprising sulfuric acid, acid soluble oils and one or more fluorine-containing compounds, such as hydrofluoric acid, fluorosulfuric acid and/or alkyl fluorides, is passed to combustion zone 30 through line 24. Combustion supporting gas, such as air, is added to combustion zone 30 through line 32 while fuel, if needed, is added through line 34. The combustion products, typically comprising sulfur oxides, such as $SO_2$ and/or $SO_3$, CO, $CO_2$ and fluorides, such as HF, pass from combustion zone 30 through line 36 into scrubbing zone 40 for removal of fluoride compounds. Scrubbing zone 40 is shown comprising three sections, a water spray section 50, an irrigated baffle section 60 and a packed bed section 70. The scrubbing solution, normally an aqueous solution having a precipitating agent such as calcium oxide, calcium hydroxide, calcium nitrate or calcium chloride, is shown flowing from line 42 into lines 44, 46, and 48, into spray section 50, baffle section 60 and packed bed section 70, respectively. Spray section 50 is designed to cool the entering combustion product stream and knock-out particulate matter present. Irrigated baffle section 60 also is designed to remove particulate matter from the combustion product stream. Packed bed section 70 is designed to permit intimate vapor-liquid contacting, enabling the scrubbing solution to absorb fluorine-containing compounds. Scrubbing solution exits spray section 50, irrigated baffle section 60, and packed bed section 70 through lines 52, 62, and 72, respectively, flowing through line 82 into settling zone 80 where fluorine-containing compounds, such as calcium tetrafluoride, precipitate and are removed through line 84. The combustion products pass from scrubbing zone 40 to sulfur recovery zone 90 through line 92, where they are separated into a sulfur rich stream exiting through line 94 and a sulfur deficient stream exiting through 96.

Stripping zone 20 may be any unit adapted to remove the more volatile fluorine-containing compounds from the spent catalyst stream. Stripping zone 20 preferably is a shed baffle or a tray tower zone, with the tray tower zone being preferred. The operating temperature in stripping zone 20 may be maintained within the range of about 30° C. to about 120° C., preferably between about 50° C. and about 90° C. The absolute pressure at the bottom of stripping zone 20 may range from about 10 mmHg to about 2,500 mmHg, preferably within the range of about 300 to about 1,500 mmHg.

Combustion zone 30 may be any unit adapted to combust substantially all the organic compounds present. Depending upon the concentration of organic compounds in residuum stream 24, it may be necessary to provide a source of fuel for combustion of this stream. Combustion zone 30 may be a furnace or a small refractory lined combustor with the small refractory lined combustor being preferred. The operating temperature in combustion zone 30 may range from about 300° C. to about 1,500° C., preferably between about 500° C. and about 1,000° C.

Scrubbing zone 40 may be any unit adapted to remove fluorine from the combustion products. In a preferred embodiment, scrubbing zone 40 comprises, in sequence, water spray section 50, irrigated baffle section 60 and packed bed section 70. Water spray section 50, adapted to cool the entering product stream and remove particulate matter present, may comprise a spray chamber in which the combustion product gases are intimately contacted with a fine spray of calcium-containing solution. Irrigated baffle section 60, also adapted to remove particulate matter, may comprise a gas-liquid contactor, such as shed baffles. Packed bed section 70 preferably comprises a low pressure drop packing material adapted to provide intimate liquid vapor contacting, such as Raschig rings, Pall rings, or Intalox saddles.

The scrubbing solution composition should be controlled to precipitate fluorine-containing compounds without resulting in excess consumption of raw materials, a high rate of corrosion, or a significant sulfur content in the precipitate. This may be accomplished by utilizing fluorine precipitating agents. While magnesium may be utilized to precipitate fluorine, calcium and/or calcium-containing compounds which precipitate the fluorine as calcium fluoride are preferred, since calcium is relatively insoluble, and therefore not hazardous, and since the aqueous solution saturated with calcium fluoride is relatively non-toxic. If the scrubbing solution were alkaline, $SO_2$ present would precipitate as calcium sulfite. This is not desirable for several reasons. The precipitation of sulfites results in the loss of potentially recoverable sulfur. In addition, the presence of sulfites in the precipitate may cause disposal problems, since the sulfur may be resolubilized, particularly in the presence of acid rain, to produce $SO_2$. If the scrubbing solution is maintained acidic, calcium sulfite will not be formed. However, if the scrubbing solution is maintained too acidic, the solution will become excessively corrosive. The scrubbing solution, therefore, preferably is maintained within the pH range of about 2 to about 8.5, more preferably within the range of about 4.4, to about 7, to minimize both sulfite precipitation and corrosion. The aqueous scrubbing solution preferably comprises between about 2 to about 25 wt.% calcium ions to assure substantially complete precipitation of the fluorine present as calcium fluoride. This may be accomplished by utilizing calcium oxide, or calcium hydroxide as the sole source of calcium ions, and by adding an acidic compound to maintain the pH within the desired limits. However, a more effective method for assuring an adequate calcium ion concentration while simultaneously maintaining the pH within the desired limits, is by the addition of relatively soluble calcium salts, i.e. salts having a solubility greater than 5% by weight, such as calcium chloride, calcium nitrate, or calcium nitrite to the solution with calcium hydroxide and/or calcium oxide being added only to maintain the pH within the desired range. The temperature of the scrubbing solution preferably is maintained between about 30° C. and about 100° C. It has been calculated that, at these conditions, less than about 1 part per billion by volume of hydrogen fluoride will be present in the air in equilibrium with the scrubbing solution.

Sulfur recovery zone 90 may be any facility adapted to recover sulfur oxides from the combustion gas stream. It is anticipated that most applications of this invention will be in petroleum refineries having existing sulfur recovery facilities with the capacity to take the additional load generated by the present process. These sulfur facilities typically include a Claus-type unit for converting sulfur oxides into elemental sulfur by contacting the sulfur oxides with hydrogen sulfide in the presence of a vanadium oxide catalyst. Additional sulfur removal facilities well known in the art, frequently also are used to further reduce sulfur emissions.

In the process described hereinabove, it is anticipated that the spent catalyst flow rate through line 12 will be approximately 0.01 to about 1.0 pounds per gallon of alkylate produced. In stripping zone 20 approximately 20 to 60 weight percent of the entering material is removed as residuum through line 24. This stream typically will comprise about 10 to about 30 weight percent sulfur on an elemental basis, about 10 to about 1,000 parts per million by weight (wppm) fluorine on an elemental basis, with the remainder generally comprising carbon, hydrogen and oxygen. The sizes of zones 20, 30, 40 and 90 may be calculated by one skilled in the art based upon the particular residuum composition and flow rate. The design and sizing of stripping zone 20 is described generally in U.S. Pat. Nos. 3,766,293; 3,925,318; 4,073,821; and 4,096,199, the disclosures of which are incorporated herein by reference.

What is claimed is:

1. In a process for recovering fluorosulfuric acid from a solution comprising fluorosulfuric acid and acid soluble oils wherein the solution is passed to a recovery zone and separated therein into a fluorine-rich fraction and into a residuum comprising acid soluble oil and a minor amount of fluorosulfuric-containing compounds, the improvement comprising:
   (a) passing residuum into a combustion zone wherein the residuum is combusted to form combustion products;
   (b) passing combustion products from the combustion zone through a scrubbing zone adapted to remove fluorine from the combustion products; and,
   (c) passing combustion products through a sulfur recovery zone adapted to remove sulfur from the combustion products.

2. The process of claim 1 wherein the residuum comprises a fluoride, sulfuric acid and acid soluble oil.

3. The process of claim 2 wherein the combustion products from the combustion zone pass through the scrubbing zone prior to entering the sulfur recovery zone.

4. The process of claim 3 wherein the scrubbing zone comprises a water spray section, a baffle section, and a packed bed section.

5. The process of claim 3 wherein fluorine is removed from the combustion products by contacting with an aqueous scrubbing solution.

6. The process of claim 5 wherein the scrubbing solution further comprises a fluorine precipitating agent.

7. The process of claim 6 wherein the precipitating agent is selected from the group consisting of calcium oxide, calcium hydroxide, calcium salts and mixtures thereof.

8. The method of claim 7 wherein the calcium salt is selected from the group consisting of calcium chloride, calcium nitrate, calcium nitrite, and mixtures thereof.

9. The process of claim 7 wherein the scrubbing solution is passed through a settling zone adapted to precipitate a fluoride.

10. The process of claim 9 wherein scrubbing solution from the settling zone is recirculated to the scrubbing zone.

11. The process of claim 10 wherein the calcium ion concentration in the scrubbing solution is maintained between about 2 and about 25 wt.% of the scrubbing solution.

12. The process of claim 11 wherein the temperature of the scrubbing solution is maintained between about 30° and about 100° C.

13. The process of claim 12 wherein the pH of the scrubbing solution is maintained between about 2 and about 8.5.

14. The process of claim 13 wherein the pH of the scrubbing solution is maintained between about 4.4 and about 7.

15. The process of claim 3 wherein the combustion products comprise sulfur oxides.

16. The process of claim 15 wherein the sulfur oxides are reacted with hydrogen sulfide to form elemental sulfur.

17. A method for treating a residuum from an alkylation process where the waste stream comprises a fluoride, sulfuric acid and an acid soluble oil, said method comprising:
   (a) combusting the waste stream in a combustion zone to form combustion products comprising a fluoride compound, and a sulfur oxide;
   (b) passing the combustion products from the conbustion zone into a scrubbing zone wherein the combustion products are contacted with an aqueous scrubbing solution comprising about 2 to about 25 weight percent calcium ions to absorb the fluoride compound from the combustion products;
   (c) contacting the combustion products from the scrubbing zone with hydrogen sulfide in the presence of a vanadium oxide catalyst to form elemental sulfur;
   (d) passing the scrubbing solution from the scrubbing zone to a settling zone wherein the fluoride compound is precipitated from the scrubbing solution; and,
   (e) recirculating scrubbing solution from the settling zone to the scrubbing zone.

18. The method of claim 17 wherein the pH of the scrubbing solution is maintained within the range of about 2 to about 8.5.

19. The method of claim 18 wherein the pH of the scrubbing solution is maintained within the range of about 4.4 to about 7.

20. The method of claim 19 wherein the pH of the scrubbing solution is maintained within the range of about 4.4 to about 7 by the addition of a compound selected from the group consisting of calcium oxide, calcium hydroxide, and mixtures thereof to the scrubbing solution.

21. The method of claim 20 wherein the calcium ion content of the scrubbing solution is maintained within the desired range by the addition of a compound selected from the group consisting of calcium salts, calcium oxide, calcium hydroxide and mixtures thereof.

22. The method of claim 21 wherein the calcium salts are selected from the group consisting of calcium chloride, calcium nitrate, calcium nitrite and mixtures thereof.

* * * * *